(12) United States Patent
Okubo (10) Patent No.: US 11,088,894 B2
(45) Date of Patent: Aug. 10, 2021

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Hiroshi Okubo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 81 days.

(21) Appl. No.: 15/155,458

(22) Filed: May 16, 2016

(65) Prior Publication Data
US 2016/0352610 A1    Dec. 1, 2016

(30) Foreign Application Priority Data

May 29, 2015   (JP) .............................. JP2015-110528

(51) Int. Cl.
*H04L 12/24* (2006.01)
(52) U.S. Cl.
CPC .......... *H04L 41/0213* (2013.01); *H04L 41/22* (2013.01)
(58) Field of Classification Search
CPC .............................. H04L 41/0213; H04L 41/22
See application file for complete search history.

(56) References Cited

U.S. PATENT DOCUMENTS 9,226,334 B2    12/2015  Matsuda
9,367,273 B2 *   6/2016  Shibata ................. G06F 3/1236
2005/0148326 A1  7/2005  Nogawa et al.
2007/0174441 A1  7/2007  Okamoto et al.
2010/0094954 A1 * 4/2010  Han ................. H04L 29/12264
                                                    709/219
2011/0153815 A1 * 6/2011  Aoki ................... H04L 61/2046
                                                    709/224

(Continued)

FOREIGN PATENT DOCUMENTS

JP          4720520        7/2011
JP       2012-029139 A     2/2012

(Continued)

OTHER PUBLICATIONS

Japanese Office Action dated Jun. 4, 2019, in related Japanese Patent Application No. 2015-110528 (with English translation).

*Primary Examiner* — Chris Parry
*Assistant Examiner* — Abderrahmen Chouat
(74) *Attorney, Agent, or Firm* — Venable LLP (57) ABSTRACT

A communication apparatus has a wireless interface for which a first IP address corresponding to a first mode of the wireless interface is assigned. A processor performs steps of receiving search information which is transmitted to a transmitting destination of a second IP address, from an external apparatus via the wireless interface, determining whether or not the second IP address corresponds to the first IP address corresponding to the first mode of the wireless interface, and transmitting interface information indicating the first mode or a second mode of the wireless interface, and apparatus information of the communication apparatus, to the external apparatus. The interface information indicating the first mode or the second mode is transmitted based on whether the second IP address corresponds to the first IP address.

9 Claims, 8 Drawing Sheets (56) References Cited

U.S. PATENT DOCUMENTS

| | | | | |
|---|---|---|---|---|
| 2013/0057908 A1* | 3/2013 | Park | ................... | H04L 61/2015 |
| | | | | 358/1.15 |
| 2013/0148149 A1* | 6/2013 | Park | ..................... | G06F 3/1296 |
| | | | | 358/1.13 |
| 2014/0085666 A1* | 3/2014 | Park | ..................... | G06K 15/405 |
| | | | | 358/1.15 |
| 2014/0092425 A1* | 4/2014 | Park | ..................... | H04W 8/005 |
| | | | | 358/1.15 |
| 2015/0116746 A1* | 4/2015 | Park | ..................... | G06F 3/1292 |
| | | | | 358/1.13 |

FOREIGN PATENT DOCUMENTS

| | | |
|---|---|---|
| JP | 2012-080199 A | 4/2012 |
| JP | 2013-207541 A | 10/2013 |
| JP | 2013-219430 A | 10/2013 |
| JP | 2015-144334 A | 8/2015 |

\* cited by examiner

COMMUNICATION APPARATUS, COMMUNICATION METHOD, AND STORAGE MEDIUM

BACKGROUND OF THE INVENTION

Field of the Invention

The present invention relates to a communication apparatus, a communication method, and a storage medium

Description of the Related Art

In recent years, a device begins to support a plurality of communication interfaces and there is a case where one device is used by a plurality of client computers for different purposes for each of the communication interfaces supported by the device. On a client computer, normally, an application that performs device search processing and setting processing of a device is installed (hereinafter, referred to as a setting application). A user searches for and performs a setting of a device on a network by operating the setting application.

As a method of searching for a device on a network, the method that uses the SNMP (Simple Network Management Protocol) is known. The setting application mainly uses a method of searching for a device on a network by transmitting a broadcast packet or a multicast packet by using the SNMP.

In the case where the setting application searches for a device on a network, in order to determine the communication interface supported by the device, it is necessary to make an inquiry about detailed information on the communication interface of the device. Normally, the setting application acquires information on the device by transmitting a GetNextRequest command or a GetRequest command that specifies an MIB (Management Information Base) ObjectID (hereinafter, referred to simply as OID) by using the SNMP. Then, the application determines the communication interface supported by the device based on the acquired information. The OID includes, for example, an IfNumber, an IfIndex, an IfDescr, and an IfType.

Further, in the situation where a device that supports a plurality of communication interfaces exists on a network, in the case where the setting application transmits a request to search for a device, there is a possibility that response information for the search request is returned from each communication interface of the device. In this case, there is a possibility that the one and the same device is regarded as a plurality of devices. Japanese Patent No. 4720520 has described that one of the communication interfaces, i.e., the wireless LAN interface and the wired LAN interface included in the device having received a search request, which corresponds to the protocol that is used for the search request, responds to the search request.

However, in the case where the setting application makes an attempt to determine the communication interface supported by the device by using information corresponding to each OID at the time of device search, it is necessary for the setting application to make an inquiry to the device a number of times.

SUMMARY OF THE INVENTION

The communication apparatus according to the present invention is a communication apparatus having a plurality of communication interfaces, and the communication apparatus includes: a determination unit configured to determine, in the case where one of the plurality of communication interfaces receives a request requesting information on a communication interface, whether the one communication interface is a communication interface for a wireless LAN or a communication interface for a wired LAN; and a response unit configured to transmit a response for the request, which includes the determination results, to a source of transmission of the request.

Further features of the present invention will become apparent from the following description of exemplary embodiments (with reference to the attached drawings).

DESCRIPTION OF THE EMBODIMENTS

Hereinafter, with reference to the attached drawings, embodiments for embodying the present invention are explained. Configurations shown in the following embodiments are merely exemplary and the present invention is not limited to the configurations shown schematically.

First Embodiment

Figure 1:
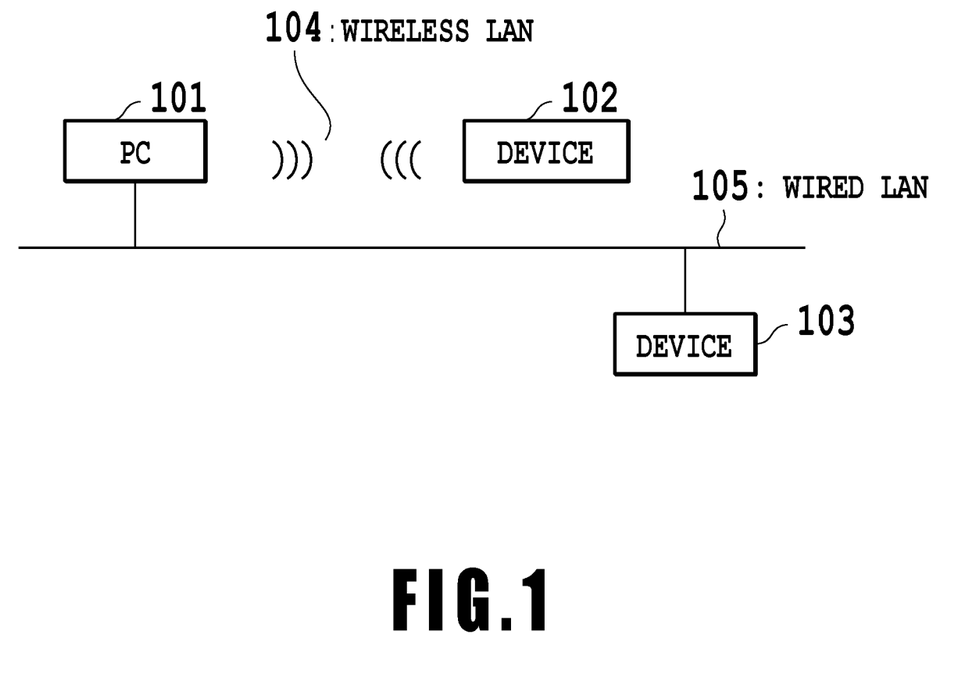
FIG. 1 is a block diagram showing an example of an information processing system according to a first embodiment.

FIG. 1 is a block diagram showing an example of an information processing system according to a first embodiment. The information processing system shown in FIG. 1 includes a personal computer (PC) 101, a device 102, and a device 103. The PC 101 and the device 102 are connected through a wireless LAN 104. The PC 101 and the device 103 are connected through a wired LAN 105.

The PC 101 and the device 102 are capable of communication in a plurality of operation modes by using the wireless LAN 104. The plurality of operation modes includes an infrastructure mode in which the operation is performed via an external access point, not shown schematically, and a direct mode in which direct communication with a partner of communication is established. The direct mode includes the Wifi Direct (registered trademark). In FIG. 1, the two devices are illustrated, but the information processing system may include any number of devices. Further, in FIG. 1, the one PC is illustrated, but the information processing system may include any number of PCs.

A communication packet transmitted from the PC 101 reaches the device 102 through the wireless LAN 104. Further, a communication packet transmitted from the PC 101 reaches the device 103 through the wired LAN 105. The device 102 and the device 103 respond to the packet transmitted from the PC 101.

Figure 2:
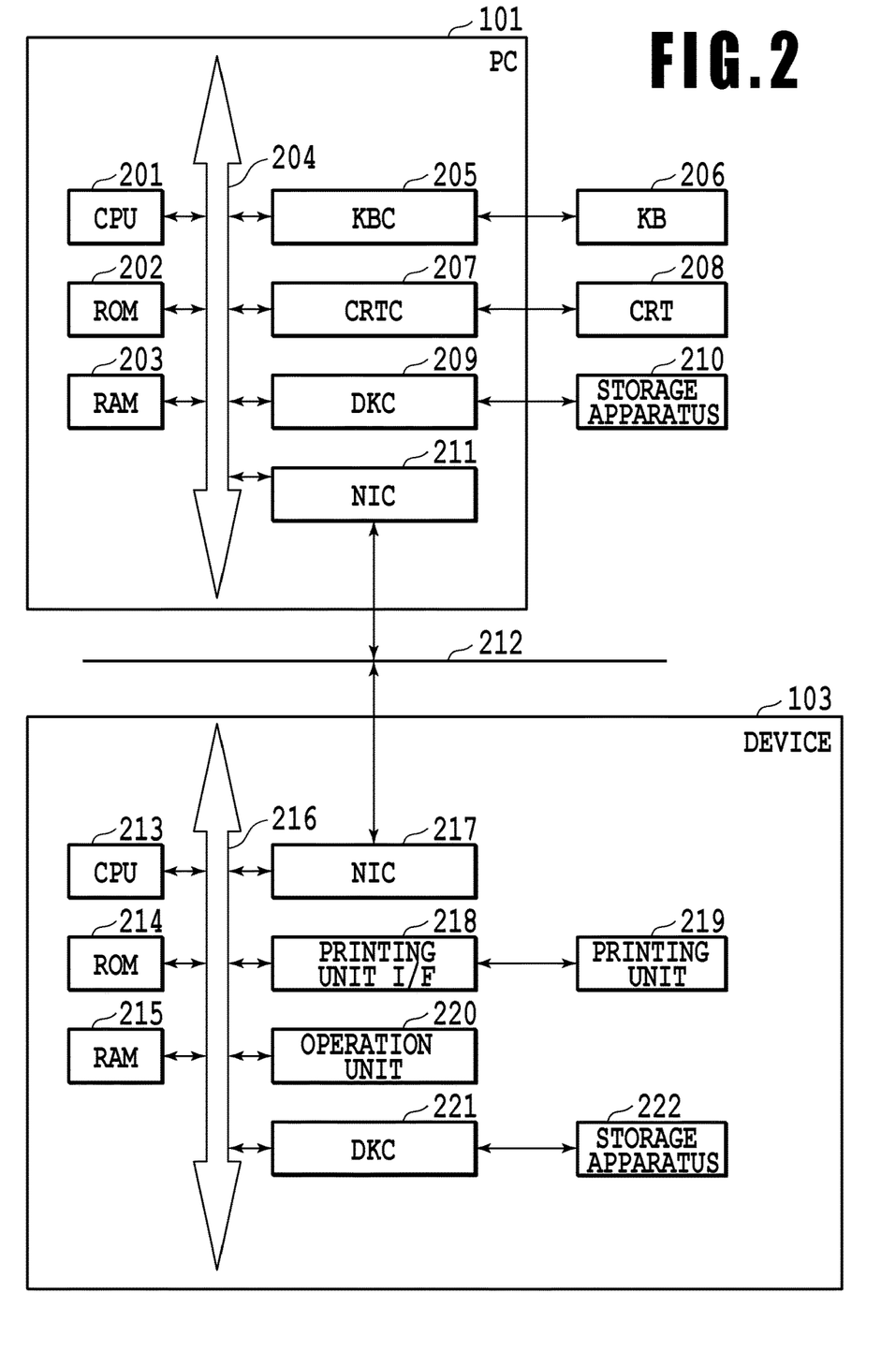
FIG. 2 is a block diagram showing examples of configurations of a personal computer and a device shown in FIG. 1.

FIG. 2 is a block diagram showing examples of configurations of the PC 101 and the device 103 shown in FIG. 1. The configuration of the device 102 is the same as the configuration of the device 103, and therefore, explanation thereof is omitted. The PC 101 and the device 103 are capable of communication through a LAN 212. The LAN 212 is a communication network. The LAN 212 may be a wired LAN or a wireless LAN.

First, the configuration of the PC 101 is explained.

The PC 101 has a CPU 201, a ROM 202, a RAM 203, a Keyboard Controller (hereinafter, referred to as KBC) 205, a CRT Controller (hereinafter, referred to as CRTC) 207, a Disk Controller (hereinafter, referred to as DKC) 209, and a Network Interface Card (hereinafter, referred to as NIC) 211. Each of the ROM 202, the RAM 203, the KBC 205, the CRTC 207, the DKC 209, and the NIC 211 is connected to a CPU bus 204 and can access one another via the CPU bus 204.

The CPU 201 centrally controls each component connected to the CPU bus 204 in accordance with control programs stored in the ROM 202.

The ROM 202 stores control programs or the like that control each component of the PC 101. The RAM 203 functions as a temporary storage memory used by the CPU 201. The RAM 203 stores drawing objects created as print data. Further, the RAM 203 is used as a work memory or the like that is used temporarily by the control programs stored in the ROM 202. The RAM 203 may be configured so as to extend the memory capacity by using an optional RAM that is connected to an extension port, not shown schematically.

The KBC 205 controls a keyboard 206 with which to input character information, various commands, etc.

The CRTC 207 controls a CRT 208, which is a display apparatus. It may also be possible to cause the CRTC 207 to control a display apparatus other than the CRT. For example, it may also be possible to cause the CRTC 207 to control a display apparatus, such as a flat panel display having a flat display area using liquid crystal or the like.

The DKC 209 controls a storage apparatus 210. The storage apparatus 210 is an external storage apparatus and is, for example, a flexible disk drive or a hard disk drive. In the storage apparatus 210, programs, such as a setting application, are stored.

The NIC 211 performs bidirectional communication with a peripheral, such as a printer, through a network. The NIC 211 has a communication interface for wireless LAN (hereinafter, referred to as wireless LAN interface) and a communication interface for wired LAN (hereinafter, referred to as wired LAN interface) as communication interfaces.

The CPU bus 204 is a CPU bus. The CPU bus 204 includes an address bus, a data bus, and a control bus.

Next, the configuration of the device 103 is explained. In FIG. 2, the configuration in the case where the device 103 is a printing apparatus (printer) is shown.

The device 103 has a CPU 213, a ROM 214, a RAM 215, an NIC 217, a printing unit interface (I/F) 218, a printing unit 219, an operation unit 220, a DKC 221, and a storage apparatus 222. The storage apparatus 222 may be set outside the device 103.

The CPU 213 outputs an image signal to the printing unit 219 via the printing unit I/F 218 connected to a system bus 216 in accordance with control programs or the like stored in the ROM 214 or the storage apparatus 222.

The RAM 215 functions as a main memory or a work area of the CPU 213.

The NIC 217 performs bidirectional communication with a peripheral through a network. The NIC 217 is a wireless LAN interface or a wired LAN interface. The device 103 may support only the wired LAN interface, only the wireless LAN interface, or both the wireless LAN interface and the wired LAN interface. In the case where the device 103 supports both the wireless LAN interface and the wired LAN interface, both may operate at the same time, or only one of both may operate.

The printing unit 219 is a printer engine.

The operation unit 220 has an input unit, such as a button and a touch panel, and a display unit, such as a liquid crystal panel and an LED. The operation unit 220 performs processing to receive an input operation, such as an operation mode setting of the device 103, and processing to display an operation state of the device 103.

The DKC 221 controls access between the storage apparatus 222 and the CPU 213.

The storage apparatus 222 is, for example, a hard disk. The storage apparatus 222 functions as a work area or a temporary storage memory of the CPU 213.

Figure 3:
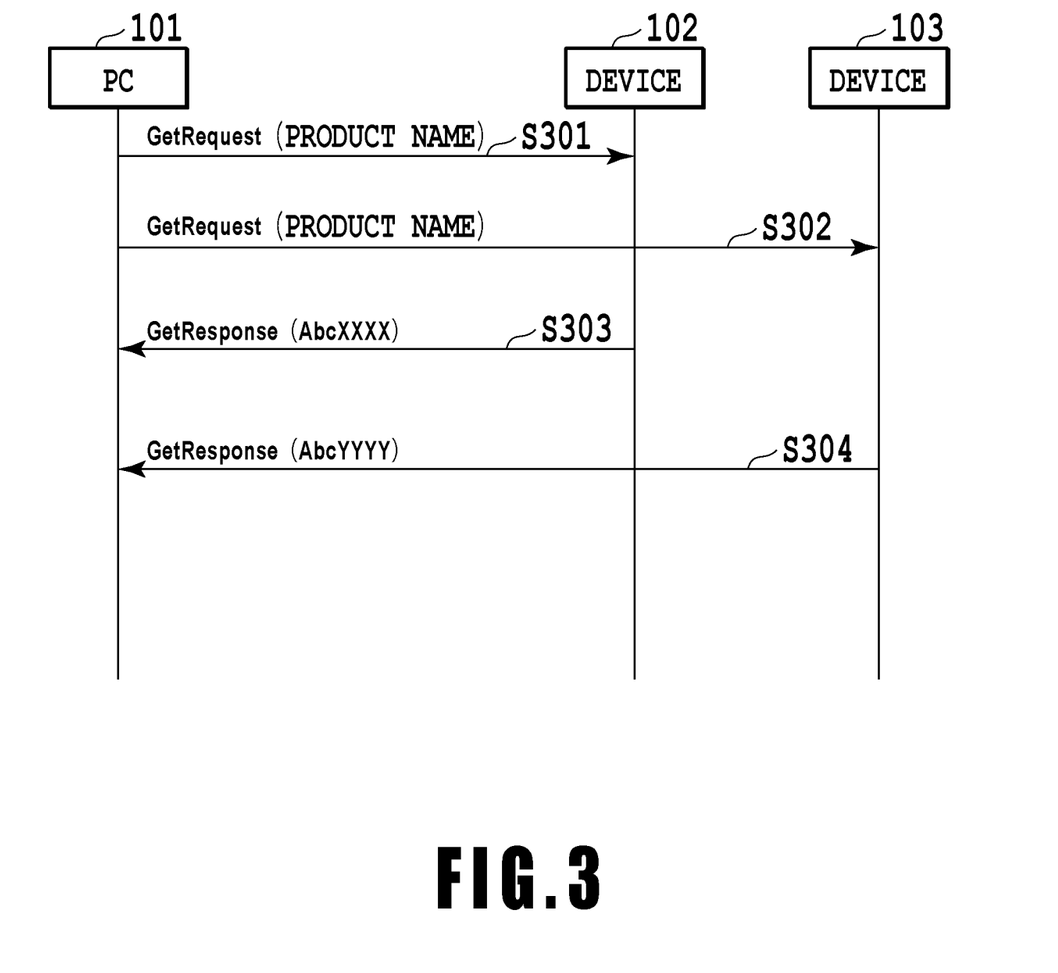
FIG. 3 is a sequence diagram showing general device search processing using the SNMP.

FIG. 3 is a sequence diagram showing general device search processing that uses the SNMP. FIG. 3 shows a sequence in the case where the PC 101 searches for the device 102 and the device 103 on a network. As shown in FIG. 3, the PC 101 transmits a broadcast packet or a multicast packet in the case of searching for a device on a network (steps S301, S302). At this time, the PC 101 specifies an OID for making an inquiry about the product name of the device in a packet and then transmits the packet. Hereinafter, the packet that is transmitted at this time is referred to as a search packet or a request packet. The search packet transmitted from the PC 101 reaches the device 102. The search packet transmitted from the PC 101 reaches the device 103. The devices 102 and 103 respond to the search packet transmitted from the PC 101 (steps S303, S304). Here, the device 102 transmits a packet storing a product name of "AbcXXXX". The device 103 transmits a packet storing a product name of "AbcYYYY". The PC 101 displays information on devices on a network in a list on a UI screen shown in FIG. 8 based on the information acquired based on the search sequence such as this. The UI screen in FIG. 8 will be described later.

Figure 4:
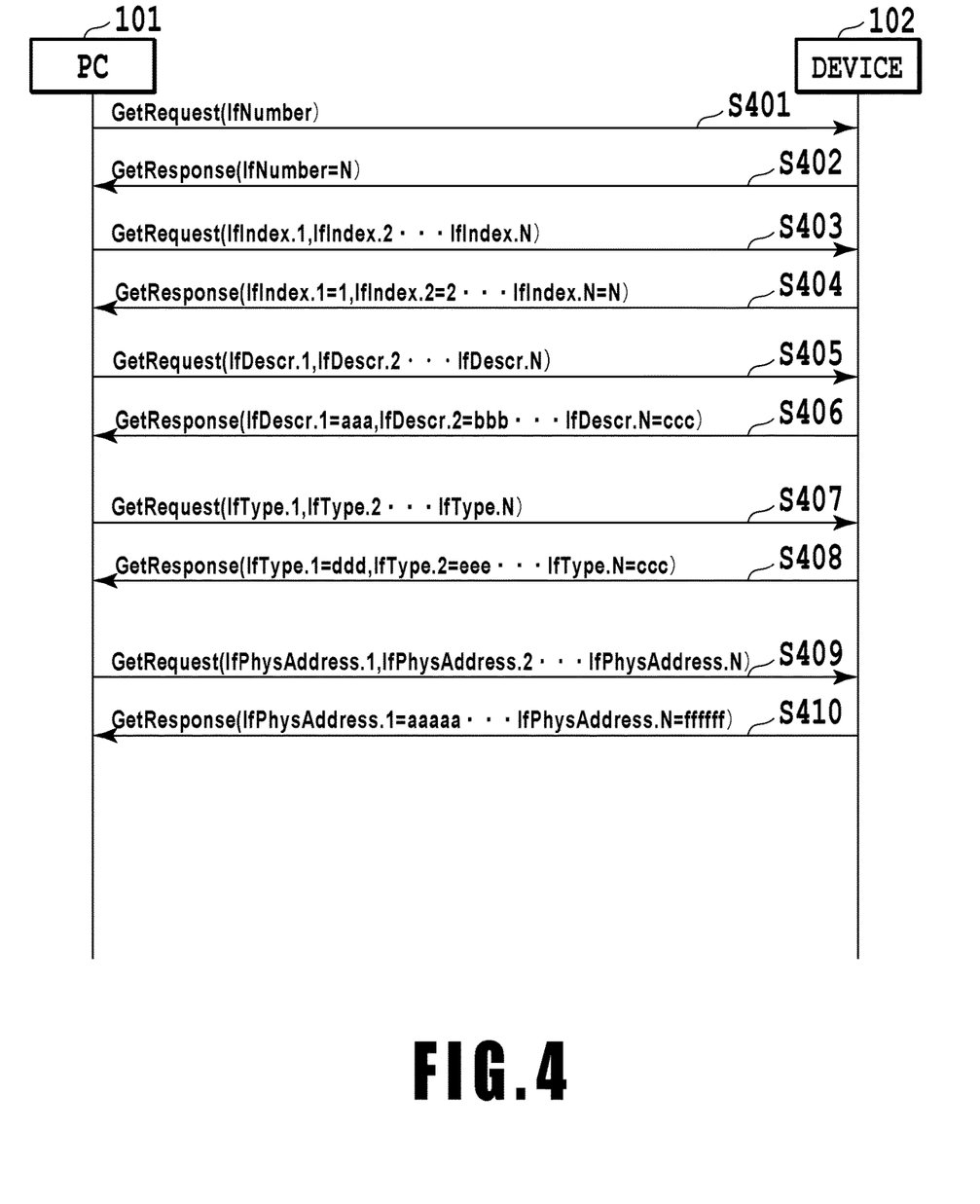
FIG. 4 is a sequence diagram showing general processing to acquire information on the communication interface supported by the device by using the SNMP.

FIG. 4 is a sequence diagram showing general processing to acquire information on the communication interface supported by the device by using the SNMP.

FIG. 4 shows a sequence in the case where the PC 101 acquires information on the communication interface supported by the device 102 by communication in accordance with the standard communication specifications. The PC 101 makes an inquiry to the device 102 about the number of communication interfaces supported by the device 102 (step S401). Specifically, the PC 101 transmits a GetRequest command that specifies an OID (IfNumber) for acquiring the number of communication interfaces to the device 102. The device 102 performs processing to respond to the inquiry at step S401 (step S402). After having acquired the number of communication interfaces supported by the device 102, the PC 101 makes an inquiry about the index value of each communication interface (step S403). Specifically, the PC 101 transmits a GetRequest command that specifies an OID (IfIndex) for acquiring the index value of the communication interface to the device 102. The device 102 performs processing to respond to the inquiry at step S403 (step S404). Next, the PC 101 makes an inquiry about the description of each communication interface (step S405). Specifically, the PC 101 transmits a GetRequest command that specified an OID (IfDescr) for acquiring the description of each communication interface to the device 102. The device 102 performs processing to respond to the inquiry at step S405 (step S406). Next, the PC 101 makes an inquiry to the device 102 about the type of the communication interface. Specifically, the PC 101 transmits a GetRequest command that specifies an OID (IfType) for acquiring the type of the communication interface to the device 102. The device 102 performs processing to respond to the inquiry at step S407 (step S408). Next, the PC 101 makes an inquiry to the device 102 about the MAC address of each communication interface (step S409). Specifically, the PC 101 transmits a GetRequest command that specifies an OID (IfPhysAddress) for acquiring the MAC address of the communication interface to the device 102. The device 102 performs processing to respond to the inquiry at step S409 (step S410).

The PC 101 determines the communication interface supported by the device 102 based on the information acquired at steps S402, S404, S406, S408, and S410. The command that is used by the PC 101 at the time of making an inquiry to the device about the information on the communication interface or the like may be a GetRequest command or a GetNextRequest command. However, in the case where a GetNextRequest command is used, the number of times of bidirectional communication between the PC and the device increases as compared to the case where a GetRequest command is used.

As described above, in the processing shown in FIG. 4, it is necessary for the PC 101 to perform communication a large number of times in order to determine the communication interface supported by the device 102, which is the communication partner. Because of this, there is such a problem that not only the processing at the time of device search becomes complicated but also the search time is lengthened.

Figure 5:
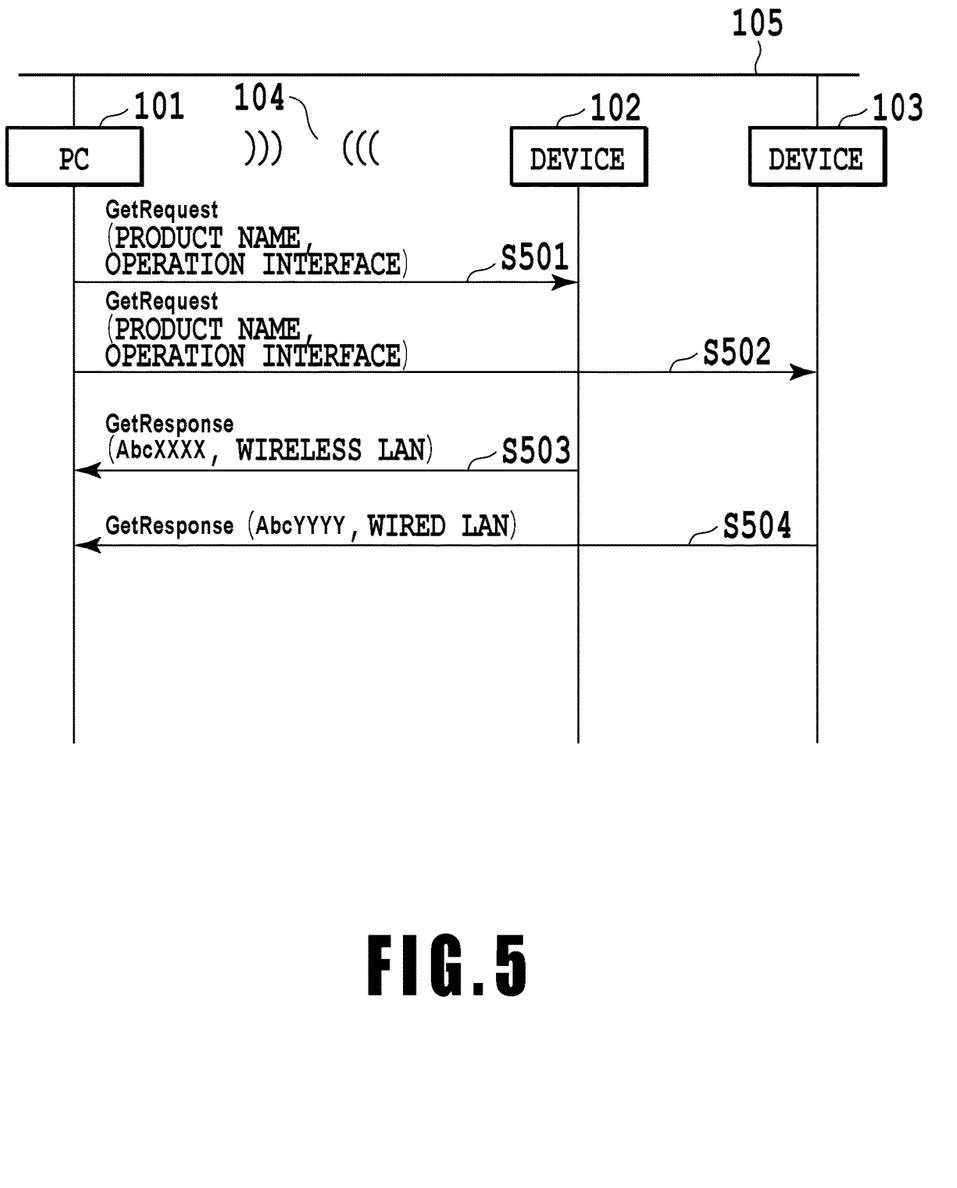
FIG. 5 is a sequence diagram showing device search processing in the first embodiment.

FIG. 5 is a sequence diagram showing processing at the time of the device search processing in the present embodiment.

First, the PC 101 transmits a search packet by the broadcast or the multicast (steps S501, S502). At this time, the PC 101 specifies an OID for making an inquiry about the product name of the device and the communication interface that operates in the device (hereinafter, referred to as the operation interface) in the search packet. The device 102 is connected with the PC 101 through the wireless LAN 104, and therefore, the device 102 returns the product name "AbcXXXX" and the operation interface "wireless LAN" as a response to the inquiry by the search packet. Further, the device 103 is connected with the PC 101 through the wired LAN 105, and therefore, the device 103 returns the product name "AbcYYYY" and the operation interface "wired LAN" as a response to the inquiry by the search packet (steps S503, S504).

Due to this, it is made possible to determine the operation interface of the device without performing the bidirectional communication a plurality of times between the PC and the device as shown in FIG. 3 and FIG. 4.

Hereinafter, with respect to processing to determine the operation interface of the device, a flow on the PC side and a flow on the device side are explained.

Figure 6:
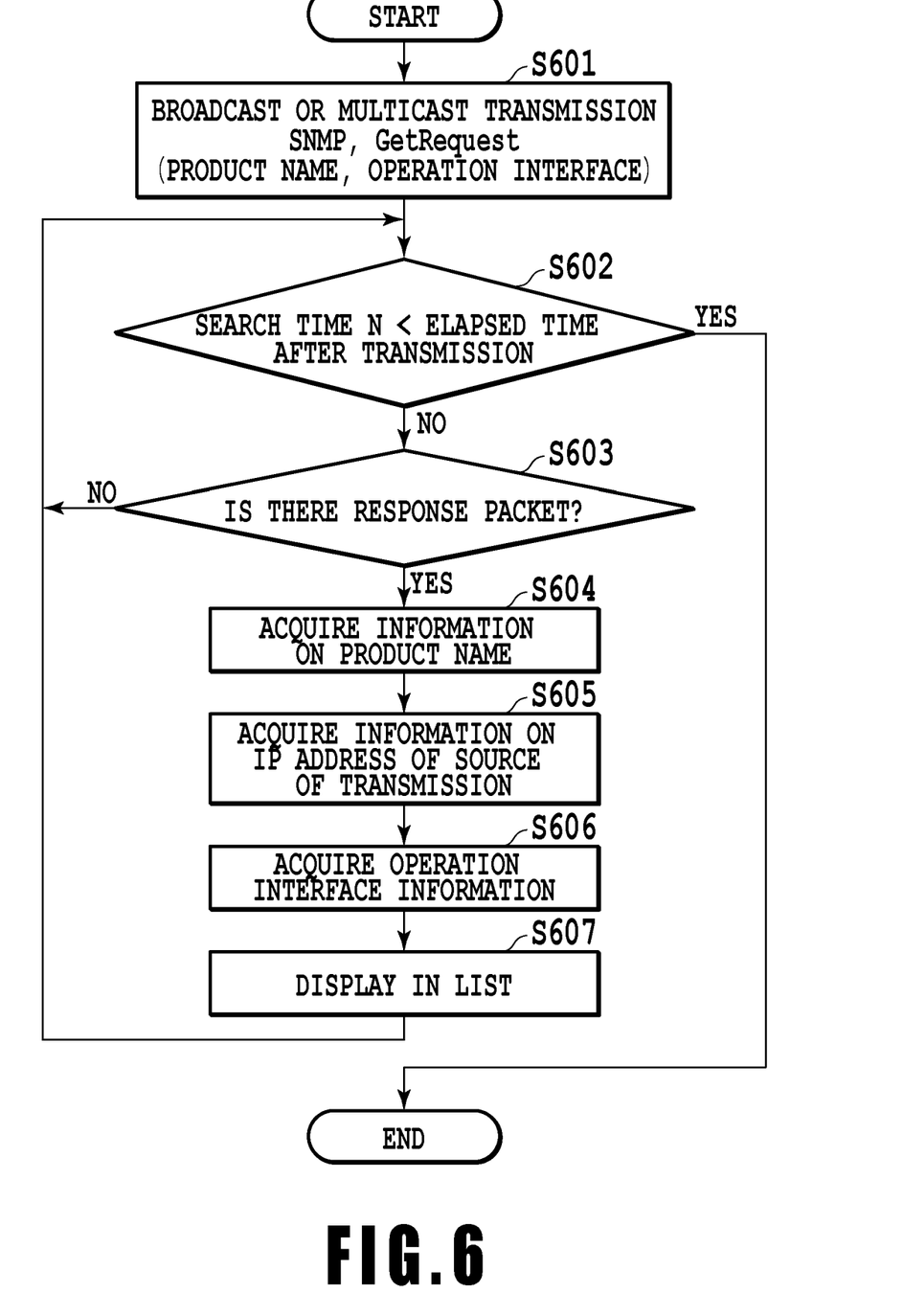
FIG. 6 is a flowchart showing search packet transmission processing of the personal computer at the time of device search processing in the first embodiment.

FIG. 6 is a flowchart showing the search packet transmission processing of the PC 101 at the time of the device search processing in the present embodiment.

The PC 101 transmits a search packet by the broadcast or multicast (step S601). At this time, as described above, the PC 101 specifies an OID for making an inquiry about the product name and the operation interface in a GetRequest command in the SNMP and transmits the search packet. The PC 101 compares the elapsed time after the transmission of the search packet with a search time N (step S602). The search time N is stored in advance in the RAM 203 or the like of the PC 101. It may also be possible to enable a user to set the search time N.

In the case where the elapsed time exceeds the search time N (YES at step S602), the PC 101 terminates the processing. In the case where the elapsed time does not exceed the search time N (NO at step S602), the PC 101 moves to processing at step S603. At step S603, the PC 101 determines whether or not there is a response from the device, i.e., whether or not a response packet for the search packet has been received from the device (step S603). In the case where there is no response (NO at step S603), the PC 101 returns to the processing at step S602. In the case where there is a response (YES at step S603), the PC 101 moves to processing at step 604. At step S604, the PC 101 acquires the information on the product name from the packet received from the device and holds the information. Next, the PC 101 acquires the IP address of the source of transmission from the packet received from the device and holds the IP address (step S605). Next, the PC 101 acquires the information indicating the operation interface (hereinafter, referred to as operation interface information) from the packed received from the device and holds the information (step S606). Finally, the PC 101 outputs the information acquired at steps S604, S605, and S606 to the CRT 208 via the CRTC 207 (step S607). After performing the processing at step S607, the PC 101 returns to the processing at step S602.

Until the elapsed time after the transmission of the search packet exceeds the search time N, the processing at steps S602 to S607 is repeated as described above. Due to this, the information on each device that has returned a response is output to the CRT 208. In the present embodiment, the PC 101 displays the information on each device on the CRT 208 as a list. In the flow shown in FIG. 6, device information is added to the list during search, but it may also be possible for the PC 101 to hold the information acquired at steps S604, S605, and S606 until the search processing is completed and to display the information in the list after the search processing is completed. Further, it may also be possible to acquire the IP address by a GetRequest command that specifies an OID for acquiring the IP address. However, in this case, the number of times of bidirectional communication between the PC and the device increases.

The processing at steps S601 to S607 is implemented by the PC 101 executing the setting application stored in the storage apparatus 210 after loading the setting application into the RAM 203.

Figure 7:
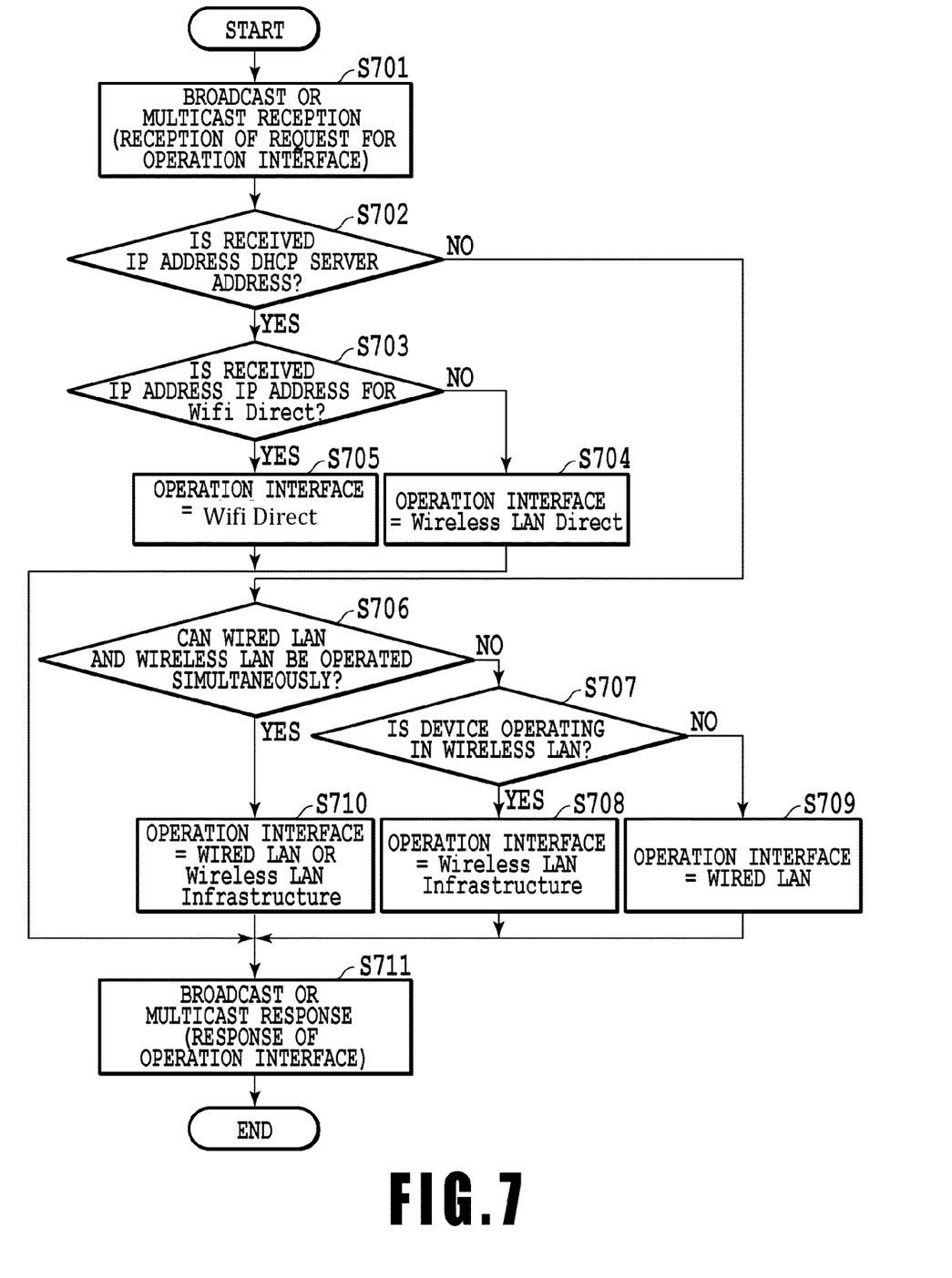
FIG. 7 is a flowchart showing response processing of the device at the time of device search processing in the first embodiment.

FIG. 7 is a flowchart showing response processing of the device 102 at the time of device search processing in the present embodiment. The processing of the device 102 and that of the device 103 are the same, and therefore, the processing of the device 102 is explained here.

The device 102 receives a search packet transmitted from the PC 101 (step S701). The device 102 determines whether the IP address of the transmission destination of the received search packet is a predetermined IP address that is allocated in the case where the device 102 itself operates as a DHCP server (hereinafter, referred to as DHCP server address) (step S702).

Here, it is assumed that there are two kinds of wireless technology operation modes in which the device 102 operates as a DHCP server: the Wifi Direct and the wireless LAN Direct print system (hereinafter, referred to simply as wireless LAN Direct), which is a standard that enables direct connection with the wireless terminal without an access point. Then, it is assumed that the IP address 10. 0. 1. 215 is determined to be allocated during the Wifi Direct operation and the IP address 10. 0. 1. 214 is determined to be allocated during the wireless LAN Direct operation. In other words, it is assumed that the operation mode corresponding to the IP address 10. 0. 1. 215 is the Wifi Direct and the operation mode corresponding to the IP address 10. 0. 1. 214 is the wireless LAN Direct. In this case, on a condition that the IP address of the transmission destination of the search packet received by the device 102 is 10. 0. 1. 215 or 10. 0. 1. 214, the IP address is the DHCP server address (YES at step S702), and therefore, the device 102 moves to processing at step S703. In the processing at step S703, the device 102 determines whether the IP address of the transmission destination of the received search packet is the IP address for the Wifi Direct. In the case where the IP address of the transmission destination of the received search packet is the IP address for the wireless LAN Direct (NO at step S703), the device 102 determines that the operation is the wireless LAN Direct operation. Consequently, the device 102 determines that the operation interface is the wireless LAN Direct (step S704). In the case where the IP address of the transmission destination of the received search packet is the address for the Wifi Direct (YES at step S703), the device 102 determines that the operation is the Wifi Direct operation. Consequently, the device 102 determines that the operation interface is the Wifi Direct (step S705).

In the case where the IP address of the transmission destination of the search packet received by the device 102 is, for example, 192. 168. 0. 215, the IP address is not the DHCP server address (NO at step S702), and therefore, the device 102 moves to processing at step S706. In the processing at step S706, the device 102 determines whether it is possible for the device 102 itself to simultaneously operate the wired LAN interface and the wireless LAN interface. The device 102 determines whether it is possible to simultaneously operate the wired LAN interface and the wireless LAN interface by, for example, referring to the setting file stored in the RAM 203 or the like. In the setting file, information indicating whether it is possible to simultaneously operate the wired LAN interface and the wireless LAN interface is stored in advance by a user or the like.

In the case where the device 102 determines that it is not possible to simultaneously operate the wired LAN interface and the wireless LAN interface (NO at step S706), the device 102 determines whether the device 102 itself is being connected to the wireless LAN, i.e., whether the wireless LAN interface is operating (step S707). In the case where the wireless LAN interface is operating (YES at step S707), the device 102 determines that the operation interface is the wireless LAN Infrastructure (S708). Here, the wireless LAN Infrastructure indicates that the wireless LAN interface is operating and the wireless LAN is infrastructure-connected. In the case where the wired LAN interface is operating, it is determined that the operation interface is the wired LAN (step S709).

In the case where the device 102 determines that it is possible to simultaneously operate the wired LAN interface and the wireless LAN interface (YES at step S706), the device 102 determines that the operation interface is the wired LAN or the wireless LAN Infrastructure (step S710).

The device 102 transmits a response packet including the determination results, i.e., a response packet in which the operation interface information is set to the PC 101 (step S711).

In the case where a plurality of communication interfaces is operating in the device 102, each communication interface that is operating receives the search packet transmitted by the broadcast or the multicast. In this case, the response processing at steps S701 to S711 is performed for each search packet received by each communication interface.

Figure 8:
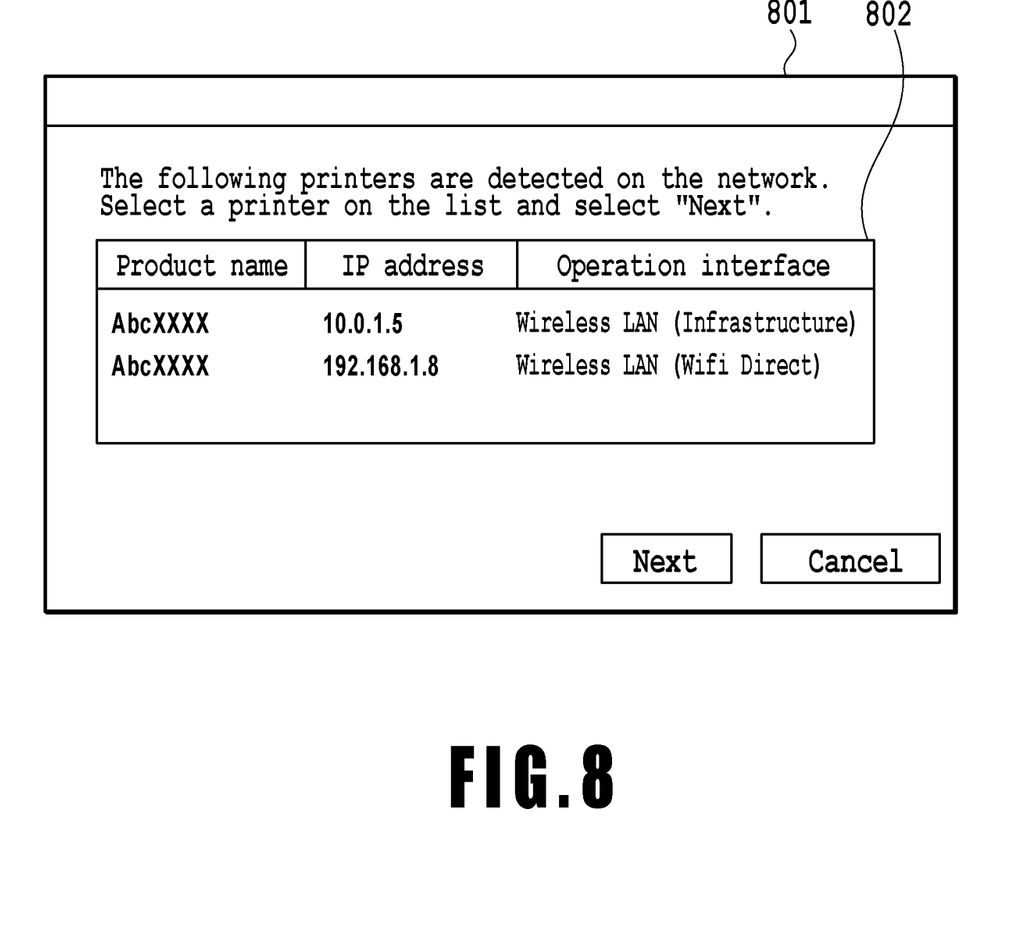
FIG. 8 is an explanatory diagram showing an example of a UI screen of a setting application.

FIG. 8 is an explanatory diagram showing an example of a UI screen of the setting application.

In the case where the setting application is activated by the CPU 201, a UI screen 801 shown in FIG. 8 is displayed on the CRT 208. In an area 802 shown in FIG. 8, a list of detected devices is displayed. Above the area 802, text explaining which operation should be performed for the results that have been searched for is displayed. In the area 802, for each device, the product name, the IP address (IP address of the source of transmission of the response packet), and the operation interface acquired by the processing at steps S604, S605, and S606 shown in FIG. 6 are displayed. On the first line in the list shown in FIG. 8, information on the device whose product name, IP address, and operation interface are "AbcXXXX", "10. 0. 1. 5", and "wireless LAN (Infrastructure)", respectively, is displayed. On the second line in the list shown in FIG. 8, information on the device whose product name, IP address, and operation interface are "AbcXXXX", "192. 168. 1. 8", and "wireless LAN (Wifi Direct)", respectively, is displayed.

It may also be possible to add a serial number or the like to the product name then display the product name in the list. For example, it may also be possible to set the product name as "AbcXXXX (12345678)". In order to implement such an aspect, it is sufficient to include a serial number of the product (e.g., "12345678") in the product name information acquired in the processing at step S604 shown in FIG. 6, in addition to the product name. As described above, by adding information that can specify the device to the product name, it is made possible for a user to recognize a device even in the case where a plurality of devices having the same product name exists on a network.

In the above description, the case is explained as an example where the devices 102 and 103 are each a printing apparatus, but the devices 102 and 103 may be various kinds of communication apparatus, such as a camera, a PC, and a smartphone.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to easily acquire information on an available communication interface from a device in the case where a device on a network is searched for.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110528, filed May 29, 2015, which is hereby incorporated by reference wherein in its entirety.

What is claimed is:

1. A communication apparatus having a wireless interface, the apparatus comprising:
   a memory configured to store a program;
   at least one processor configured to execute the program stored in the memory,
   wherein the at least one processor performs,
   allocating a predetermined IP address for wifi direct to the communication apparatus based on the communication apparatus operating as a DHCP server by the communication apparatus and connecting with a first external apparatus by wifi direct;
   receiving search information which includes any IP address, via direct communication between the communication apparatus and the first external apparatus by wifi direct or an infrastructure communication between the communication apparatus and a second external apparatus via an access point, wherein in a case the search information is received via the direct communication, the search information includes the predetermined IP address for wifi direct having been allocated to the communication apparatus;
   determining whether or not the IP address included in the received search information is the predetermined IP address for wifi direct and has been allocated to the communication apparatus,
   transmitting first interface information indicating wifi direct, based on the determination that the IP address included in the received search information is the predetermined IP address for wifi direct and has been allocated to the communication apparatus, and
   transmitting second interface information indicating an interface of the communication apparatus used in the infrastructure communication, based on the determination that the IP address included in the received search information is not the predetermined IP address for wifi direct and has been allocated to the communication apparatus.

2. The communication apparatus according to claim 1, wherein
   the search information is transmitted by a broadcast or a multicast.

3. The communication apparatus according to claim 1, wherein the search information is a request packet, as the request, and a response packet is transmitted.

4. The communication apparatus according to claim 1, wherein the communication apparatus has a wireless interface and a wired interface, and
   the at least one processor further performs,
   determining whether or not the search information is received via the wireless interface or the wired interface based on the determination that the IP address included in the received search information is not the predetermined IP address for wifi direct and has been allocated to the communication apparatus, and
   wherein the second interface information is transmitted based on the determination that the IP address included in the received search information is not the predetermined IP address for wifi direct has been allocated to the communication apparatus and the determination that the search information is received via the wireless interface, and
   wherein a third interface information indicating that the wired interface based on the determination that the IP address included in the received search information is not the predetermined IP address for wifi direct and has been allocated to the communication apparatus and the determination that the search information is received via the wired interface.

5. The communication apparatus according to claim 4, wherein the communication apparatus can simultaneously operate the wired interface and the wireless interface.

6. The communication apparatus according to claim 1, wherein the communication apparatus is a printing apparatus.

7. The communication apparatus according to claim 1, wherein the apparatus information is a name of the communication apparatus.

8. The communication apparatus according to claim 1, wherein apparatus information of the communication apparatus is transmitted in addition to the first interface information and the second interface information.

9. A communication method in a communication apparatus having a wireless interface, the method comprising the steps of:
   allocating a predetermined IP address for wifi direct to the communication apparatus based on the communication apparatus operating as a DHCP server by the communication apparatus and connecting with a first external apparatus by wifi direct;
   receiving search information which includes any IP address, via a direct communication between the communication apparatus and the first external apparatus by wifi direct or an infrastructure communication between the communication apparatus and a second external apparatus via an access point, wherein in a case the search information is received via the direct communication, the search information includes the predetermined IP address for wifi direct and has been allocated to the communication apparatus;
   determining whether or not the IP address included in the received search information is the predetermined IP address for wifi direct and has been allocated to the communication apparatus,
   transmitting first interface information indicating wifi direct, based on the determination that the IP address included in the received search information is the predetermined IP address for wifi direct and has been allocated to the communication apparatus, and transmitting second interface information indicating an interface of the communication apparatus used in the infrastructure communication, based on the determination that the IP address included in the received search information is not the predetermined IP address for wifi direct and has been allocated to the communication apparatus.

* * * * *